(12) United States Patent
Schechter et al.

(10) Patent No.: US 7,716,685 B2
(45) Date of Patent: May 11, 2010

(54) PLUGGABLE WINDOW MANAGER ARCHITECTURE USING A SCENE GRAPH SYSTEM

(75) Inventors: Greg D. Schechter, Seattle, WA (US); Gregory D. Swedberg, Bellevue, WA (US); Christopher A. Fortier, Kirkland, WA (US); Jevan Saks, Redmond, WA (US); Ian Hanschen, Redmond, WA (US); Leonardo E. Blanco, Redmond, WA (US); Adrian Secchia, Bellevue, WA (US); Andrey E. Arsov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 11/215,355

(22) Filed: Aug. 30, 2005

(65) Prior Publication Data

US 2007/0061733 A1 Mar. 15, 2007

(51) Int. Cl.
*G06F 9/44* (2006.01)
*G06T 1/00* (2006.01)
*G06T 11/20* (2006.01)

(52) U.S. Cl. .......................... 719/328; 345/418; 345/440
(58) Field of Classification Search ................. 719/310, 719/320, 328, 329; 715/762, 763, 740, 766; 345/419, 428, 440, 451, 418
See application file for complete search history.

(56) References Cited

U.S. PATENT DOCUMENTS

| 6,266,053 | B1* | 7/2001 | French et al. | 715/255 |
| 6,307,558 | B1* | 10/2001 | Mao | 345/428 |
| 6,765,574 | B1* | 7/2004 | Mao et al. | 345/428 |
| 6,983,283 | B2* | 1/2006 | Sowizral et al. | 707/102 |
| 7,184,038 | B2* | 2/2007 | Sowizral et al. | 345/420 |
| 7,290,216 | B1* | 10/2007 | Kawahara et al. | 715/762 |
| 7,466,315 | B2* | 12/2008 | Beda et al. | 345/440 |
| 2005/0182844 | A1* | 8/2005 | Johnson et al. | 709/230 |
| 2006/0010454 | A1* | 1/2006 | Napoli et al. | 719/328 |
| 2006/0028479 | A1* | 2/2006 | Chun et al. | 345/531 |

OTHER PUBLICATIONS

Paffenroth et al. "Dataviewer: A Scene Graph Based Visualization Tool", 2002 IEEE, pp. 147-148.*

* cited by examiner

*Primary Examiner*—Van H Nguyen
(74) *Attorney, Agent, or Firm*—Workman Nydegger (57) ABSTRACT

Described is a pluggable policy component that determines the look and feel, or windows visual experience, of a computer user interface. Window-related instructions are redirected to the policy component, while client area change instructions are provided to a substrate (into which the policy component plugs in) that includes a composition component. The plug-in policy component handles windows-related (e.g., structural or attribute) changes to a scene graph to construct and maintain the scene graph, while the substrate handles program content changes to the client areas within windows. The substrate may include a desktop window manager that has access to the client areas in the scene graph, whereby the desktop window manager can copy a client area for rendering. For example, the desktop window manager can provide a supplemental live thumbnail image of a window.

14 Claims, 4 Drawing Sheets

PLUGGABLE WINDOW MANAGER ARCHITECTURE USING A SCENE GRAPH SYSTEM

BACKGROUND

The look and feel of an operating system's user interface provides the primary user experience with the operating system. For example, the user experience is based on what the windows of a graphical windowing environment look like, how they are positioned on the screen relative to other windows, and so forth.

The cost to change the look and feel of an operating system is significant. In general, a design team provides a design, and programmers code the operating system to match what the design team desires. As new innovations and designs emerge, the cost is repeated whenever a new look and feel is specified.

SUMMARY

Briefly, various aspects of the present invention are directed towards a policy component that is a plug-in to a substrate, in which the policy component determines the look and feel, or windows visual experience, of a user interface. The plug-in policy component handles windows-related (e.g., structural or attribute) changes to a scene graph, while the substrate handles program content changes to the client area within a window.

Window-related instructions and client area change instructions are separated such that the window-related instructions are provided to the policy component, and the client area change instructions are provided to the substrate, including a composition component. The window-related instructions are processed by the policy component to construct and maintain a scene graph, while the client area change instructions are processed at the composition component to change visible data output in the client areas within the scene graph. A redirection component, which may be part of the substrate, may be used to perform the separation.

The substrate may include a desktop window manager that has access to the client areas in the scene graph, whereby the desktop window manager can copy a client area for rendering. For example, the desktop window manager can provide a supplemental live thumbnail image of a window.

The policy component thus is responsible for the look and feel of windows rendered from the scene graph. By replacing the pluggable policy component with another pluggable policy component, a different look and feel of windows rendered from the scene graph may be provided.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
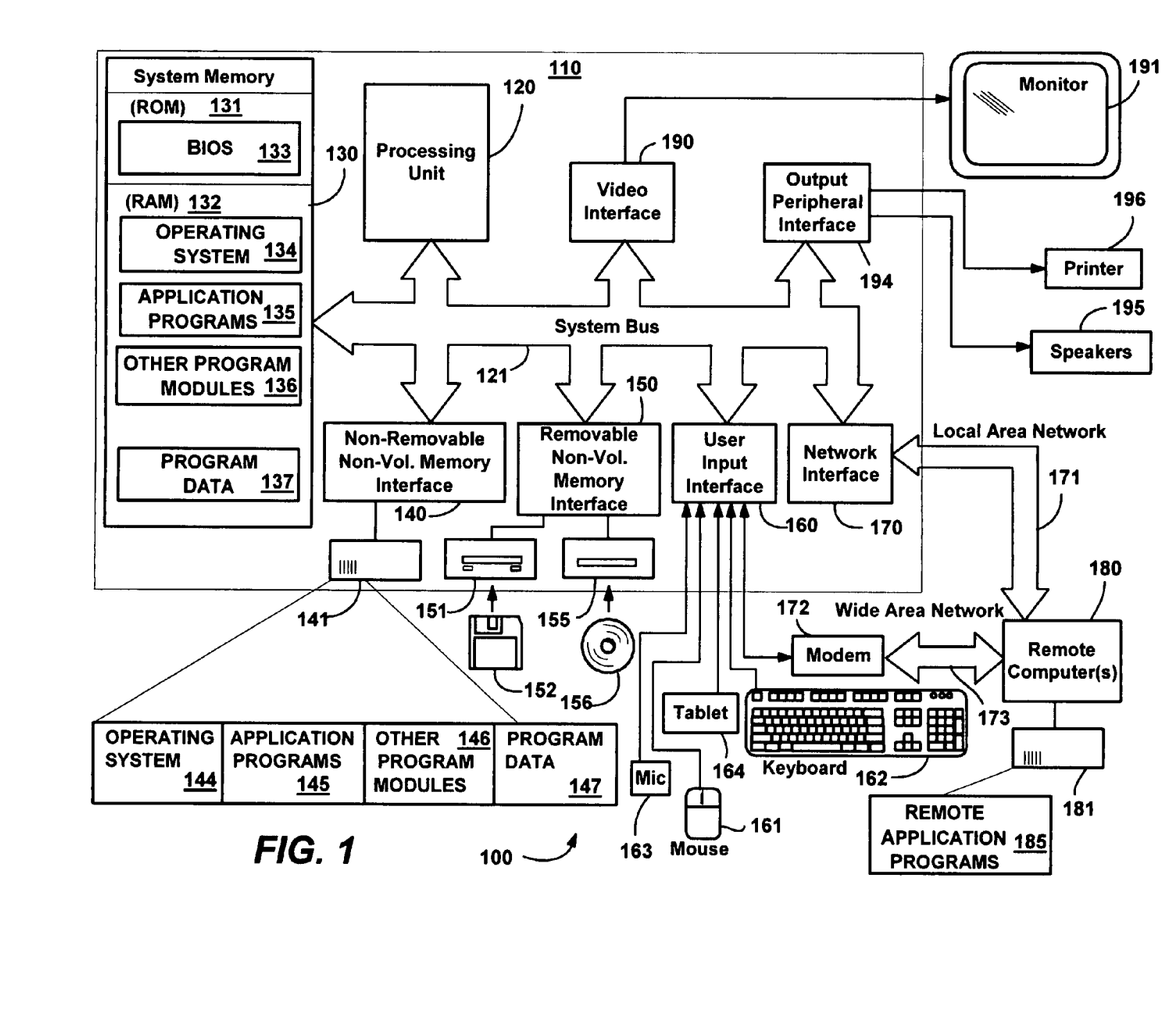
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Pluggable Window Manager Architecture

A scene graph comprises a data structure in which graphics instructions are retained for later rendering. Alternative synonymous terms for "scene graph" as used herein include "display list," "display tree," and "retained mode graphics system."

Various aspects of the technology described herein are directed towards a desktop window manager architecture that is designed to include a pluggable visual policy for windows atop a scene graph layer that provides the user window experience, while providing a number of productivity, reliability and other visual benefits. In one implementation, a desktop window manager includes a pluggable visual policy component, or layer, that provides the visual policy (including semantics) for the user window experience with the system, e.g., the appearance of windows, how the windows are positioned on the screen relative to other windows, and so forth. Because the visual policy component is pluggable, subsequent releases and/or different arrangements of the operating system may replace one implementation with another implementation that can change the look and feel of the user experience, in potentially drastic ways, such as, for example, a complex three-dimensional world. In general and as described below, this pluggability can be accomplished without changes to the underlying code (referred to herein as a substrate) that manages most of the interactions with the rest of the operating system. As a result the cost and effort of implementing a new and innovative look and feel is substantially reduced.

However, as will be understood, the present invention is not limited to any architecture described herein, but may also apply to other architectures. For example, the examples herein are described in the context of a Microsoft Windows®-based operating system and framework, however the present invention will apply to other operating systems and/or frameworks. Moreover, the division of functionality and structure between the various components is somewhat arbitrary, and it is also equivalent to have the functionality and structure implemented in a lesser number of components, or in more components, than those described herein. As such, any of the examples mentioned herein are non-limiting, and the present invention may be used various ways that provide benefits and advantages in computing in general.

Figure 2:
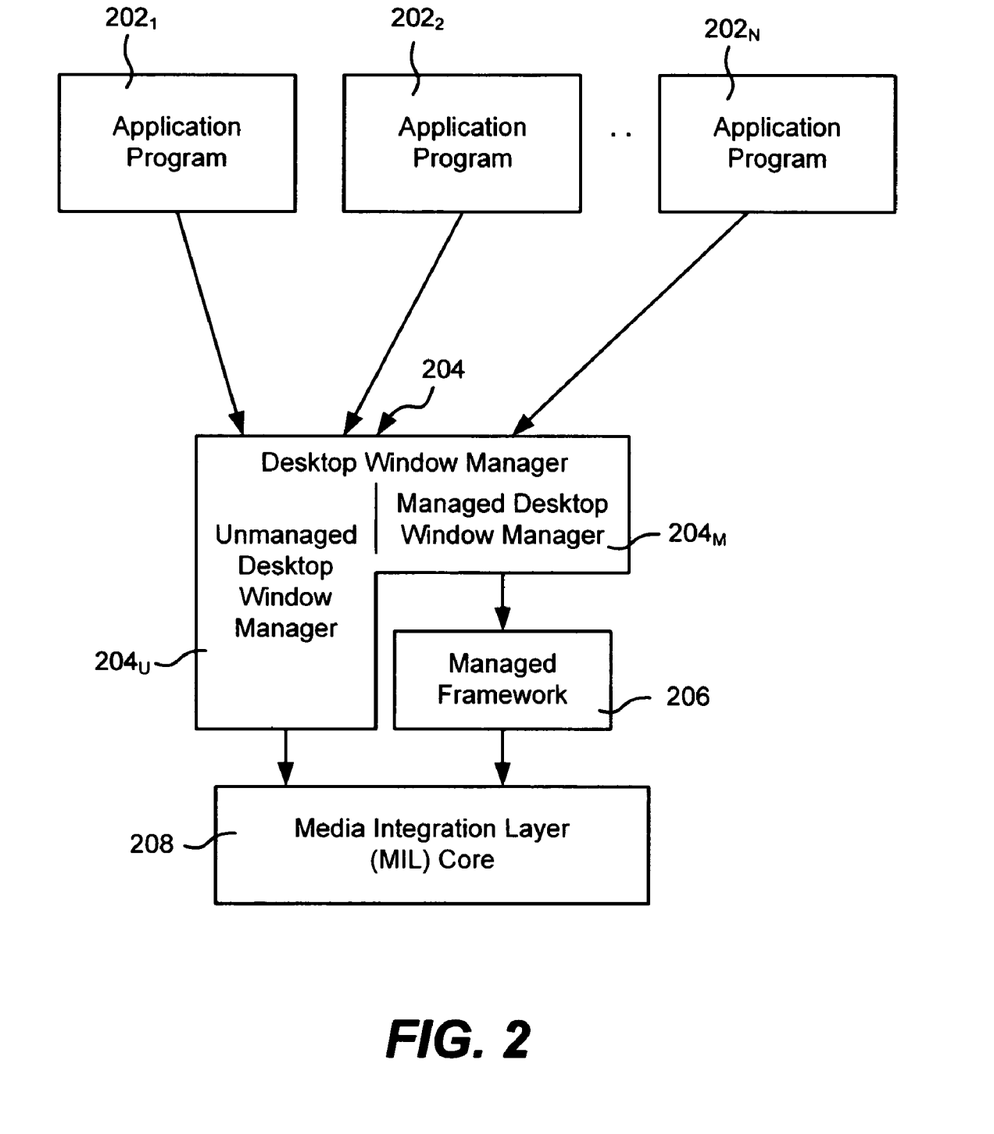
FIG. 2 is a block diagram representing an example architecture in which a desktop window manager receives application program content and other window-related messages.

Turning to FIG. 2 of the drawings, there is shown a block diagram generally representing an exemplary architecture of system components for providing a graphical windowing environment experience. In general, application programs $202_1$-$202_N$ output graphics instructions, which may be immediate mode (e.g., GDI or DX) graphics commands and/or bitmaps intended by the application to be directly output to the display, or retained mode graphics instructions (e.g., vector graphics commands) directed to a drawing surface of a scene graph/rendering tree for later output. Whether immediate or retained mode, a desktop window manager may route the graphics commands and bitmaps to per-application retained mode surfaces, and composes the surfaces for rendered output. Alternatively, the system may directly compose from at least one of the application program's graphics instruction stream without requiring an intermediate surface.

The desktop window manager may be written with any technology. For example, as represented in FIG. 2, the desktop window manager 204 may include an unmanaged desktop window manager component $204_U$ (e.g., written in native processor specific code) and/or a managed desktop window manager component $204_M$ (e.g., written in managed .NET code/Common Language Runtime or CLR). Note that these may be separate components, and are only examples; any number of variations are capable of performing equivalent operations above a scene graph system.

In general, if present, the unmanaged desktop window manager component $204_U$ calls functions of a media integration layer (MIL) core 208, while if present, the managed desktop window manager component $204_M$ calls functions of a managed (e.g., CLR/.NET) framework 206, which in turn calls the media integration layer (MIL) core 208. In one implementation, the managed framework 206 allows programs to output their user interface code in markup language such as XAML, and also provides higher-level operations such as styling, data binding and inheritance. Note that an alternative window manager may be written in managed code yet use the low level MIL functionality, e.g., rather than XAML.

A primary function of the desktop window manager 204 is to process the off-screen surfaces to which the application programs have provided content and other instructions, and/or directly compose from application program graphics instructions. The desktop window manager 204 knows about these surfaces, and receives notifications about when they change, as well as when they are moved, resized and so forth. The desktop window manager 204 processes this information, and, having access to the surfaces and/or instruction streams (corresponding to windows) of the applications, is responsible for compositing them for rendering to the display.

Note that because the desktop window manager 204 sets up the composition of these windows, the desktop window manager 204 can perform additional functionality that cannot be done in operating systems in which applications write directly to the screen. For example, the desktop window manager 204 can take some or all of the various existing windows and show live thumbnails of existing windows. Alternatively, the desktop window manager 204 can present the various windows in a three-dimensional carousel-type configuration, with their current live content displayed. Virtually any other types of rendered output using the surfaces as sources of graphics data are feasible. Such supplemental displays of the client area may be rendered independent of whether the client area is also being shown in its corresponding program window at the same time.

In accordance with various aspects of the present invention, the desktop window manager 204 includes or is otherwise associated with a pluggable visual policy 320 (FIG. 3) that provides the window experience, which, along with the MIL core 208, construct and modify a scene graph 324. To this end, a redirection component 326 (which may be considered part of the substrate) routes application content directed to the client area of the window to a unified composition engine (UCE) 328 of the MIL core, and routes window-related commands to the pluggable visual policy component 320. Note that it is feasible to have the redirection component 326 built into the pluggable visual policy 320, however doing so would make the pluggable visual policy 320 somewhat more difficult to implement, and thus in one implementation the redirection component 326 is included in the substrate.

Figure 3:
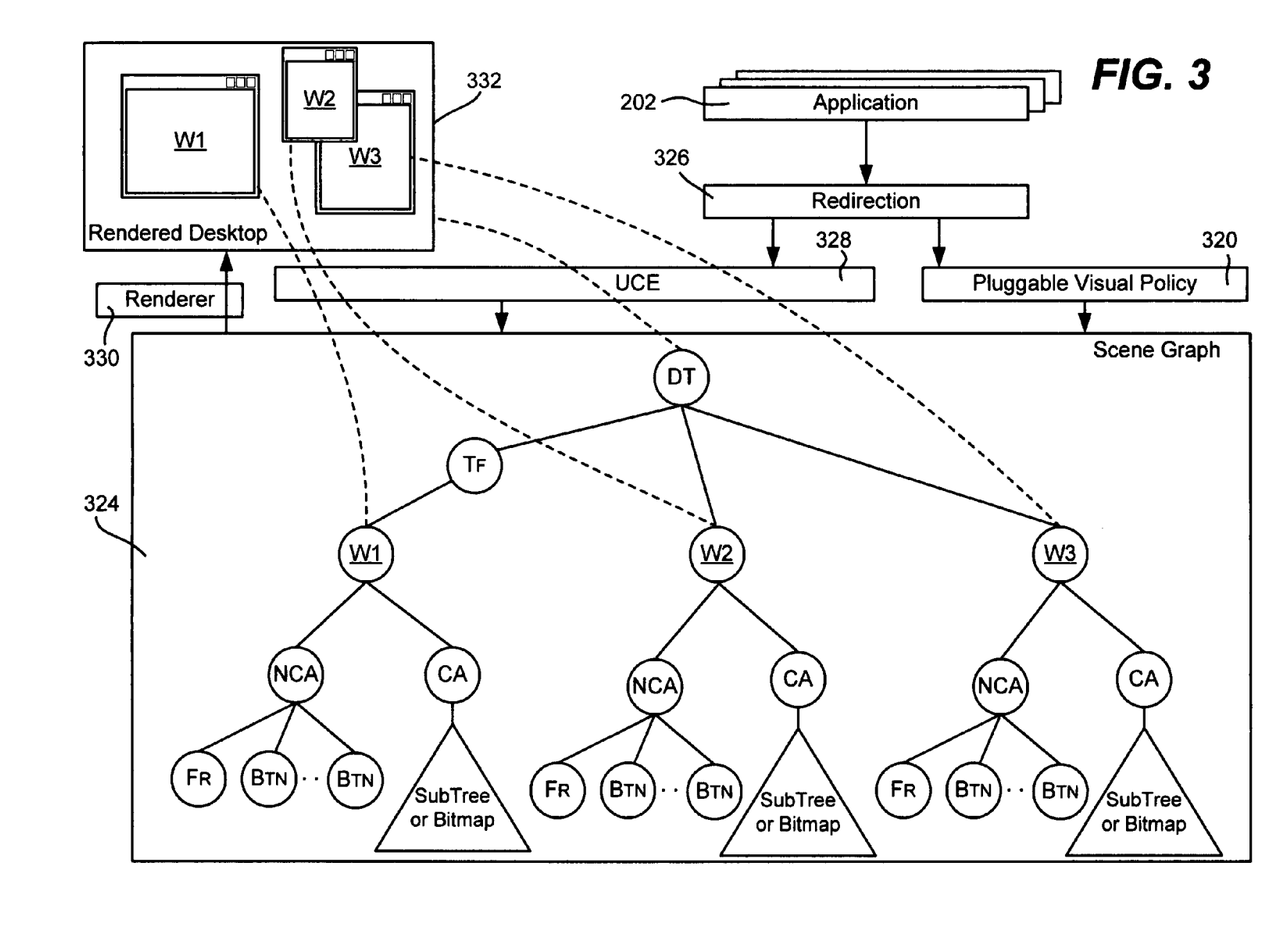
FIG. 3 is a representation of an example scene graph and rendered desktop corresponding to the scene graph, along with components for managing the scene graph.

In general, the UCE 328 writes and adjusts the client area (CA) of program windows represented by nodes in the scene graph 324. The client areas correspond to the per-application surfaces or instruction streams, and may be bitmaps or retained mode subtrees (e.g., vector graphics describing a scene subgraph). The UCE, which is part of the substrate and thus need not be replicated with each new policy, avoids having a policy developer have to handle tasks such as dirty rectangle management, occlusion culling, rendering code, scheduling code, window redirection and the like that are already provided in the UCE.

The pluggable visual policy 320 constructs and adjusts other aspects of the windows, including the non-client areas (NCA) such as the frame (FR) and window-related buttons (BTN) such as minimize, maximize and close. The pluggable visual 320 policy builds the tree below the desktop (DT) based on other application program-specified or operating system-specified operations, including window creation, window deletion, a window Z-order change, a window resize, a change to window information (e.g., title, icon, style, and so forth), window closing, window minimizing, window maximizing, window menu invoking, and so forth. The pluggable policy component 320 may also perform tree-related operations such as to place and/or modify transformation nodes (TF) in the tree, e.g., for scaling/magnification purposes, and/or to cause a thumbnail of a window to be displayed on another part of the tree.

The UCE 328 is a consumer of the scene graph 324, and is responsible for traversing it, and invoking code of a renderer 330 as appropriate. The result is a rendered desktop 332 including its windows W1-W3. Note that only changes to the scene graph 324 need be updated, thus saving significant processing resources. Indeed, the retained nature of the UCE also lends itself well to remoting the visual policy/window experience across the network to a separate client machine, in that because it is retained, the structure can be sent just once, with only edits subsequently sent.

Figure 4:
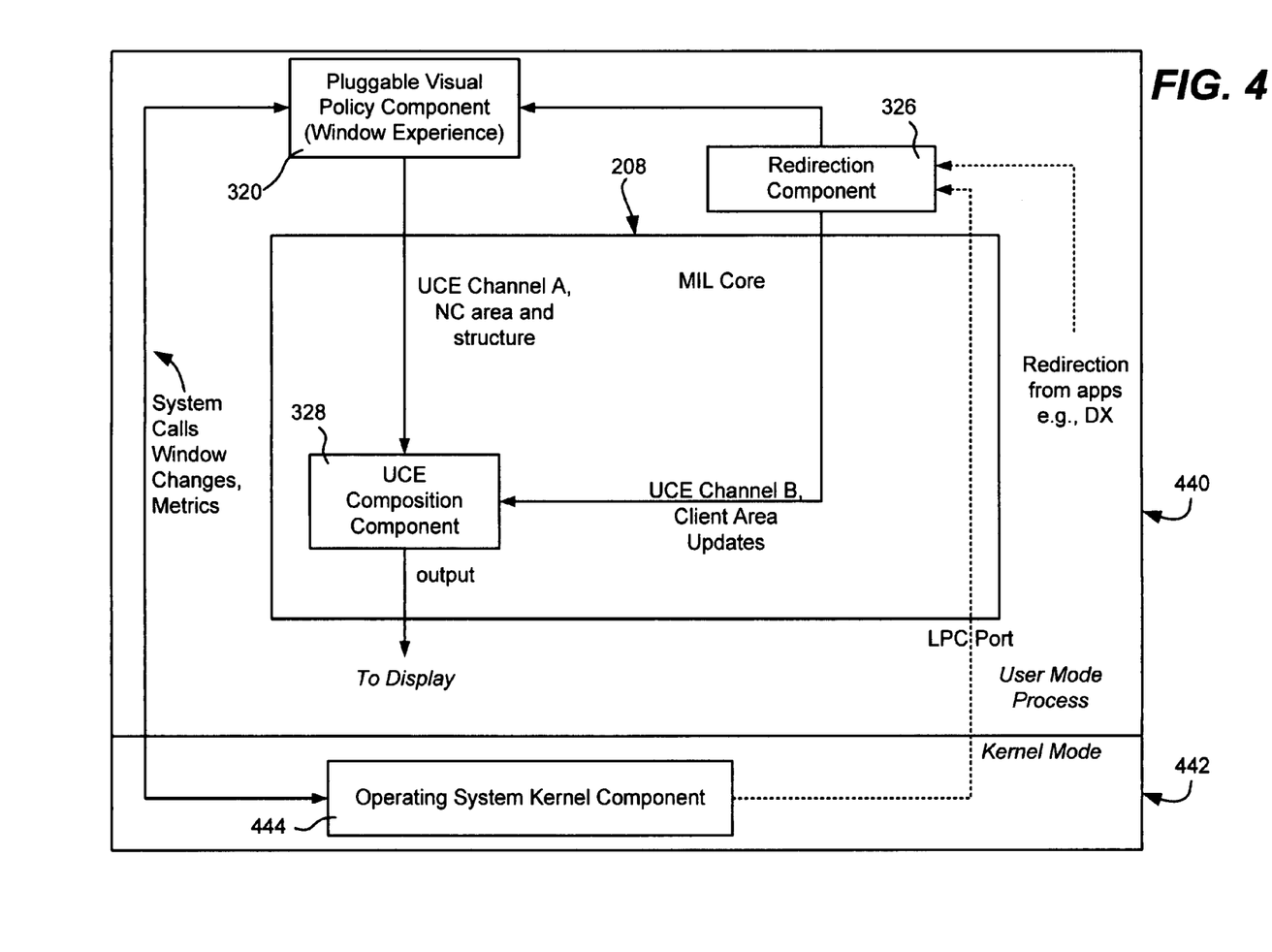
FIG. 4 is a block diagram representing a plug-in component and substrate of an example desktop window manager architecture.

FIG. 4 further illustrates the communication among the components, and is generally directed towards the moment-to-moment interactions occurring in the window manager 204 (FIG. 2) that result in the composition of the desktop. In one implementation, the desktop window manager 204 is part of a user mode process 440 that includes the window redirection component 326. The window redirection component 326 distinguishes between changes to the window-related structures in the scene graph tree 324 and changes to application program content in the client areas (CA) in the windows W1-W3, represented as nodes the scene graph tree 324.

As represented in FIG. 4 the pluggable experience component 320 is shown within the user mode process 440. In general, the remainder of the user mode process 440 comprises the "substrate", including the window redirection component 326 and the UCE 328 of the MIL core 208. Also represented in FIG. 4 are the kernel mode components 442, which include the operating system kernel component 444 (e.g., Win32K).

In general, the window redirection component 326 receives graphics-related data from the operating system kernel component 444 via a LPC (local procedure call) port or the like, such as when an application program requests via an operating system API to write to the display, e.g., via GDI graphics. Note that this communication path from the operating system kernel to the window redirection component 326 handles synchronous calls (e.g., related to hit testing) and asynchronous calls (e.g., related to window information and client area).

The window redirection component 326 also may receive application program-generated DX graphics instructions, and may receive retained mode (e.g., vector) graphics instructions from application programs that intend to write to retained surfaces or provide instruction streams for direct composition, rather than directly to the display. In general, regardless of whether the program is intending immediate mode graphics or retained mode graphics, the window redirection component 326 routes application content directed to the client area of a program window to a corresponding surface or the instruction stream for direct composition, thereby providing retained mode graphics.

The pluggable policy component 320 may receive calls from the window redirection component 326. Such calls are directed to messages such as "Window Moved," "Window Came to Front," "Window Closed," a request "Tell what section of the window was hit," and so forth. Note that the calls may be synchronous, or may be asynchronous by having the window redirection component comprise a separate thread that queues such messages for dequeuing by the pluggable policy component 320. If asynchronous, a separate communications path may be provided for synchronous out-of-band communication between the pluggable policy component 320 and the redirection component 326.

In one implementation, the input to the pluggable policy component 320 does not contain a "Window Content Changed" message, which occurs whenever the application-specific content of the window is changing, and is typically what happens most frequently. Such messages are handled directly in the window redirection component 326, considered part of the substrate, and are instead routed to the UCE 328 for writing to or otherwise modifying the application program's corresponding surface.

This separation between program content-related messages and window structure/attribute-related messages means that most commands are handled by the substrate, whereby less message handling is required by the provider of the pluggable policy component 320, making it simpler to implement. Moreover, to make development of a plug-in component 320 even more straightforward, with the managed desktop window manager $204_M$ (FIG. 2), a developer of the plug-in component 320 is able to use a standard API set to a managed framework 206 to build the visual and interactive portion of the plug-in component 320. This standard API set may be accessed through managed interfaces or through MIL core interfaces to create data types compatible with the substrate. This allows use of a managed framework and/or graphics platform to build variants of the plug-in component 320.

Returning to FIG. 4, one output from the pluggable policy component 320 comprises an output to the operating system kernel component 444, and is primarily used to get information about the state of the windows in the system, e.g., attributes such as the window text title, via calls. The communication path is also used to inject information into the operating system kernel component 444. For example, the geometric transformation that a window is subject to needs to be known by the operating system kernel component 444, so that the operating system kernel component 444 knows what portion of a window is hit during hit testing.

As described above, the output from the pluggable policy component 320 to the UCE 328 is used for building up and performing edits on the overall scene graph 324 that is rendered into the desktop 332. The pluggable policy component 320 constructs and edits the scene graph 324 representing the desktop, by using constructs (e.g., text, lines, shapes, video, images, 3D, and so forth). This may include changing the shape of the graph, e.g., adding and removing windows, but also may include changing attributes in the tree, e.g., changing a transform to change magnification from 0.5 to 1.2. The pluggable policy component 320 may also include more than one policy, and differentiate among sources of such messages, e.g., a managed application program can have a managed policy (e.g., window style and/or behavior), while an unmanaged application program can have an unmanaged policy.

The pluggable policy component 320 also has access to the redirected application windows, which it uses to construct the scene to be displayed. As described above, displays such as thumbnails of the live windows, carousels and other ways to display the live windows are thus capable of being rendered.

In summary, the substrate provides a set of services and abstractions that the developer of the pluggable policy component can leverage to provide a different window experience. Further, because the pluggable policy component is atop a scene graph API that is called to construct and maintain a retained mode scene graph, the pluggable policy component need not be concerned with processing the graphics and/or controlling the rendering loop, and instead lets such operations be handled by the substrate. This frees the pluggable policy component to be expediently written to provide new window experiences.

The development may be facilitated by use of the API set of a managed framework, e.g., using CLR/.NET framework entities. The scene graph API may provide very rich media functionality, including 2D, 3D, vector graphics, video, high quality text, and so forth.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium having computer-executable instructions, which when executed on at least one computer system perform steps, comprising:

receiving window-related instructions and client area change instructions at a redirection component of a substrate of an operating system, wherein the client area change instructions modify content of one or more applications that is to be displayed in a client area of one or more windows whereas the window-related instructions modify non-client areas of the one or more windows;

separating the window-related instructions for providing to a policy component and client area change instructions for providing to a composition component, wherein the composition component is part of the substrate whereas the policy component is pluggable such that the display of the non-client areas of the one or more windows is modifiable by plugging in a different policy component without having to modify underlying code of the substrate; and processing the window-related instructions at the policy component to construct and maintain a scene graph;

wherein the window-related instructions correspond to changes to the structure of the modify non-client areas of the one or more windows, and wherein processing the window-related instructions at the policy component to construct and maintain a scene graph comprises changing the structure of the scene graph; and wherein the substrate handles program content changes to the client area within the one or more windows, and wherein the substrate includes a desktop window manager having access to the client areas, the desktop window manager causing a copy of at least one client area to be rendered on a display.

2. The computer storage medium of claim 1 having further computer-executable instructions comprising, processing the client area change instructions at the composition component to change visible data output in the client area.

3. The computer storage medium of claim 2 wherein the client area change instructions correspond to displaying a new bitmap, and wherein processing the client area change instructions at the composition component to change visible data output in the client area comprises changing the scene graph to include the new bitmap.

4. The computer storage medium of claim 2 wherein the client area change instructions correspond to a subtree, and wherein processing the client area change instructions at the composition component to change visible data output in the client area comprises changing the scene graph to include the subtree.

5. The computer storage readable medium of claim 1 wherein processing the window-related instructions at the policy component to construct and maintain a scene graph comprises changing the non-client areas of the windows represented in the scene graph.

6. In a computing environment, a system comprising:
a processor; and
memory storing the following executable components:
a redirection component of a substrate of an operating system, the redirection component receives window-related instructions and routes them to a policy component, and receives client area change instructions and routes them to a composition component;

the policy component that constructs and maintains a scene graph based on window-related instructions received by the policy component, wherein the window-related instructions modify non-client areas of one or more windows that are rendered from the scene graph, and wherein the policy component is pluggable such that the display of the non-client areas of the one or more windows is modifiable by plugging in a different policy component without having to modify underlying code of the substrate; and the substrate into which the policy component is coupled, the substrate including the composition component that changes client areas in the scene graph based on the client area change instructions, wherein the window-related instructions received by the policy component include a change to an attribute of at least part of the scene graph; and wherein the substrate handles program content changes to the client area within the one or more windows, and wherein the substrate includes a desktop window manager having access to the client areas, the desktop window manager causing a copy of at least one client area to be rendered on a display.

7. The system of claim 6 wherein the window-related instructions received by the policy component include at least one instruction of a set, the set containing, window create, window delete, window Z-order change, window resize, window information change, window close, window minimize, window maximize, and window menu invoke.

8. The system of claim 6 wherein the substrate includes an unmanaged desktop window manager that communicates with the composition component via media integration layer application programming interfaces.

9. The system of claim 6 wherein the substrate includes a managed desktop window manager that communicates with the composition component via managed framework application programming interfaces.

10. In a computing environment, a method comprising:
redirecting, by a redirection component of a substrate of an operating system, window-related instructions received from a computer program to a policy component, and client area change instructions received from the computer program to a retained mode surface corresponding to a client area in a scene graph wherein the window-related instructions modify non-client area of one or more windows to be displayed whereas the client area change instructions modify content of one or more applications that is to be displayed in a client area of the one or more windows;

processing the window-related instructions at the policy component to construct and maintain the scene graph, wherein the policy component is pluggable such that the display of the non-client areas of the one or more windows is modifiable by plugging in a different policy component without having to modify underlying code of the substrate;

processing the client area instructions to modify the client area in the scene graph; and accessing the client area in the scene graph to provide a supplemental display of the client area that is independent of any display of a program window that includes the client area, wherein the substrate handles program content changes to the client area within the one or more windows, and wherein the substrate includes a desktop window manager having access to the client areas, the desktop window manager causing a copy of at least one client area to be rendered on a display.

11. The method of claim 10 wherein processing the window-related instructions at the policy component comprises constructing and maintaining the scene graph to provide a look and feel of windows rendered from the scene graph.

12. The method of claim 11 further comprising, replacing the policy component with another policy component to provide a different look and feel of windows rendered from the scene graph.

13. The method of claim 10 further comprising, communicating between the policy component and an operating system kernel component.

14. The method of claim 10 further comprising, traversing the scene graph to render visible output corresponding to the scene graph.

* * * * *

UNITED STATES PATENT AND TRADEMARK OFFICE
CERTIFICATE OF CORRECTION

| | | |
|---|---|---|
| PATENT NO. | : 7,716,685 B2 | Page 1 of 1 |
| APPLICATION NO. | : 11/215355 | |
| DATED | : May 11, 2010 | |
| INVENTOR(S) | : Greg D. Schechter et al. | |

It is certified that error appears in the above-identified patent and that said Letters Patent is hereby corrected as shown below:

In column 9, line 58, in Claim 5, after "storage" delete "readable".

Signed and Sealed this
Eighth Day of February, 2011

David J. Kappos
*Director of the United States Patent and Trademark Office*